July 30, 1946.      R. E. HEALD      2,404,906
DOUBLE ACTING ENGINE
Filed Oct. 4, 1944      2 Sheets-Sheet 2
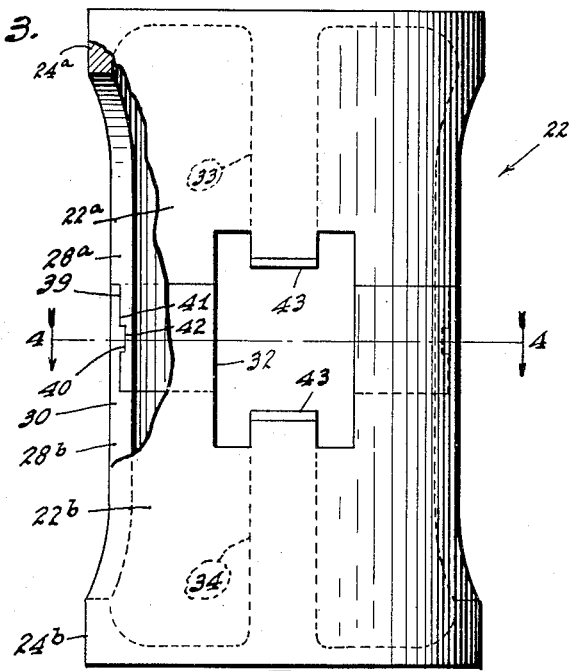
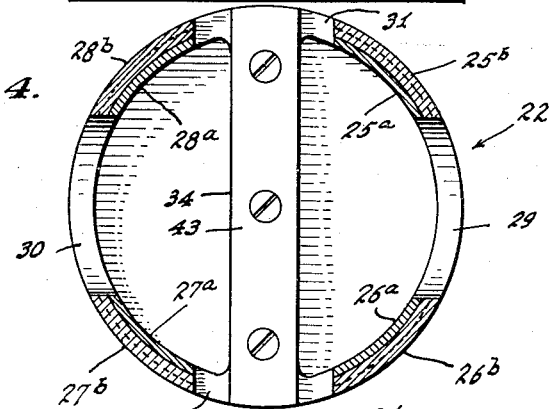
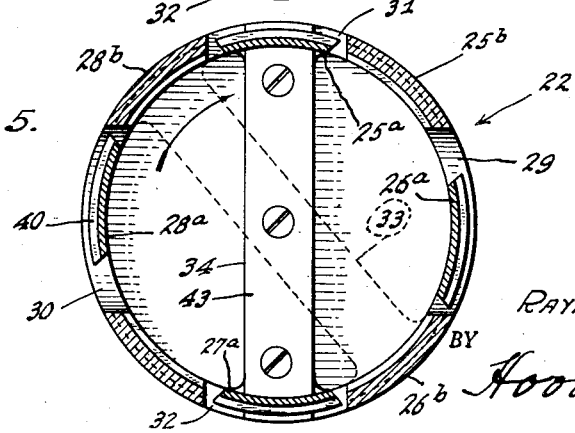
INVENTOR.
RAYMOND E. HEALD,
BY
Hood & Hahn
ATTORNEYS.

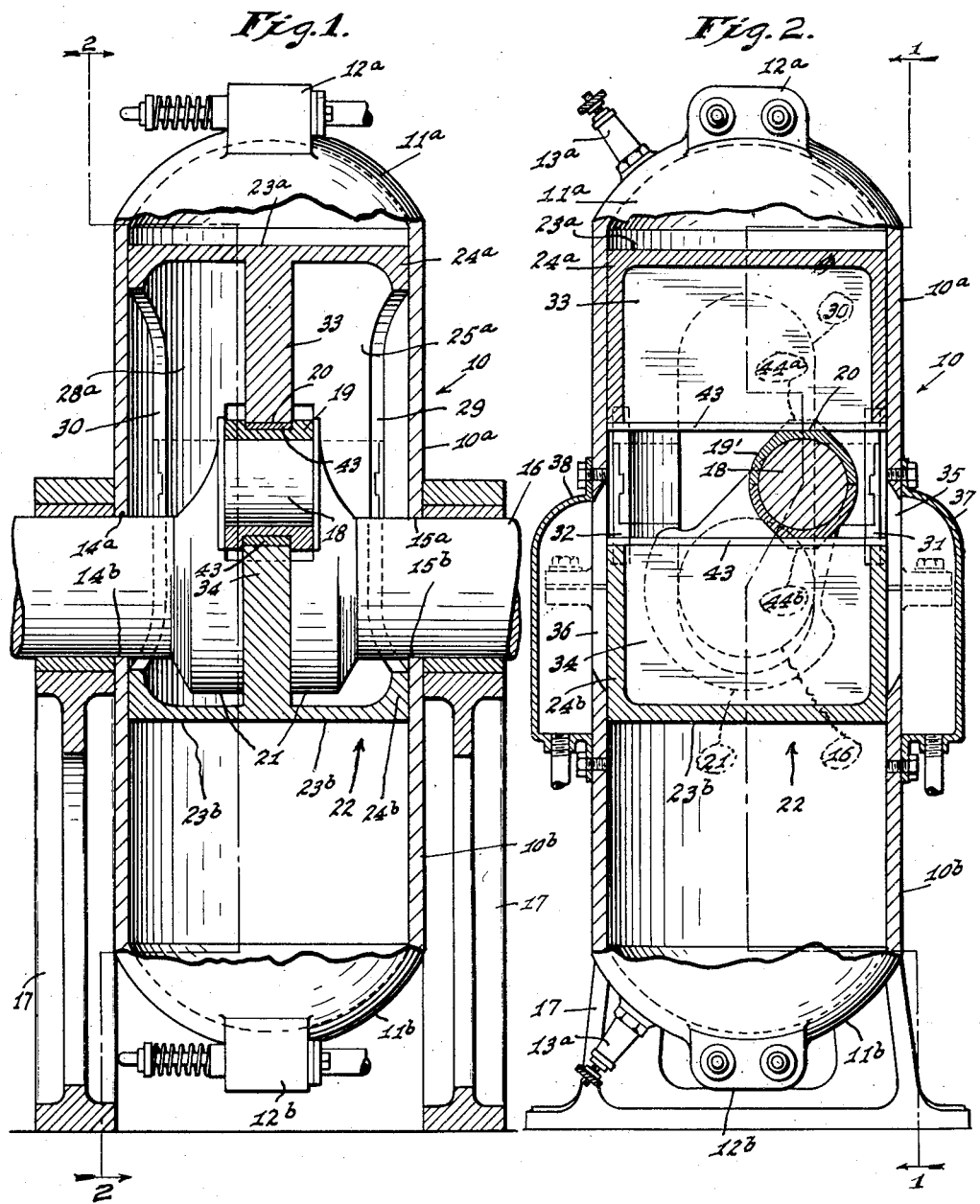

Patented July 30, 1946

2,404,906

UNITED STATES PATENT OFFICE 2,404,906

DOUBLE-ACTING ENGINE

Raymond E. Heald, Plainfield, Ind.

Application October 4, 1944, Serial No. 557,171

7 Claims. (Cl. 74—50)

The present invention relates to double acting engines, and more particularly to details of cylinder and piston construction adapted for use in such engines. The specific structure disclosed herein is particularly advantageous when used in a double acting internal combustion engine, but is adapted also to use in pumps or in fluid expansion engines of the external fluid-feed type.

The primary object of the invention is to provide a cylinder and piston assembly and an operative connection between the piston and a crankshaft, which will provide for a very high ratio between bore and stroke, conducive to extreme compactness of the assembly. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a vertical section through an assembly constructed in accordance with my invention;

Fig. 2 is a section taken substantially at right angles to the section of Fig. 1 and showing a slight modification;

Fig. 3 is an enlarged elevation of the piston assembly, parts being broken away for clarity of illustration; and Figs. 4 and 5 are detailed horizontal sections taken substantially on the line 4—4 of Fig. 3, looking in the direction of the arrows, and showing successive steps in the assembly of the piston.

Referring more particularly to Fig. 1, it will be seen that I have illustrated a cylinder, indicated generally by the reference numeral 10, and comprising two separable, mating elements 10a and 10b, each of which is provided at one end with a closure head 11a or 11b suitably provided with inlet and exhaust valve mechanism 12a or 12b. If the assembly is to be used as an internal combustion engine, ignition means, such as is indicated at 13a in Fig. 2, will be associated with each head 11a and 11b.

The opposite open ends of elements 10a and 10b are suitably secured together by any conventional fastening means such as the illustrated flanges and bolts, and said open ends are notched as at 14a and 15a and 14b and 15b to provide journal openings for a crankshaft 16 traversing the cylinder 10. Said crankshaft may be suitably supported, as in journal bearings in a frame 17, for instance.

The shaft 16 is provided with a crank portion 18, the cylinder 10 being so assembled with the shaft 16 that the crank 18 is located within the cylinder substantially upon a median line thereof. A bushing 19 is rotatably mounted on the crank 18 and, in the form of the invention illustrated in Fig. 1, said bushing is formed with an annular groove or trackway 20 in its outer periphery for a purpose later to become apparent. The crankshaft 16 is preferably counterweighted as at 21.

Reciprocably mounted within the cylinder 10 is a double-ended piston indicated generally by the reference numeral 22, and comprising two mating elements each of which is formed to provide a head, 23a or 23b having a depending, cylindrical skirt 24a or 24b. Each of said parts is further formed with a plurality of depending fingers arranged in a cylindrical series, said fingers being peripherally spaced from each other to provide diametrically opposed elongated slots 29 and 30, and another pair of diametrically elongated slots 31 and 32 spaced substantially 90 degrees from the slots 29 and 30. The slots 29 and 30 accommodate the shaft 16, while the slots 31 and 32 are provided for a purpose later to be explained.

Referring to Figs. 3 to 5, it will be seen that the piston element 22a is, in the illustrated embodiment of the invention, formed with four such depending fingers 25a, 26a, 27a, and 28a; while the element 22b is provided with a similar series of fingers 25b, 26b, 27b, and 28b. Each of the fingers of the "a" series is externally rabbeted adjacent its end remote from the head 23a, as at 39, and is further formed, within the rabbet, with a peripherally extending groove 40. Each of the fingers of the "b" series is internally rabbeted, as at 41, and is further formed, within the rabbeted area, with an inwardly projecting, peripherally extending rib 42. The rabbeted portions of the two series of fingers are adapted to mate, in the manner illustrated in detail in Fig. 3.

For assembling the two elements of the piston, the fingers of the "a" series are entered into the spaces between the fingers of the "b" series, in the manner illustrated in Fig. 5. In this connection, it will be noted that the peripheral distance between each finger of each series and one of its neighbors is at least equal to the peripheral extent of the said finger, so that such interdigitation of the fingers of the two series is possible. With the parts in the positions illustrated in Fig.

5, relative rotational movement between the two parts of the piston, in the direction indicated by the arrow in Fig. 5, will mesh the ribs 42 of the fingers of the "b" series in the grooves 40 of the fingers of the "a" series to lock the two piston elements together against relative axial movement; and it will be noted that the rabbeting is of such character that, when the fingers of the two series are thus interconnected, the external and internal surfaces of the assembled piston are substantially smooth and uninterrupted.

A diametrical fin or web 33 projects from the head 23a toward the median plane of the piston; and a similar web or fin 34 projects from the head 23b toward said plane. The parts are so proportioned that the parallel extremities of said fins are received in the groove 20 substantially in engagement with the base of said groove. It will be noted that the fins 33 and 34 are entirely enclosed within the peripheral boundaries of the piston 22. If desired, the webs 33 and 34 may be provided with strips 43 of hardened metal to bear against the bushing 19, thereby to reduce wear.

It will be obvious that reciprocatory movement of the piston 22 will be transmitted through the webs 33 and 34 to the bushing 19, and will be converted, by the crank 18, into rotation of the shaft 16. The parts are so proportioned that the path of the bushing 19 carries a portion of that bushing outside the peripheral boundaries of the piston and of the cylinder, which is the reason for the provision of the slots 31, 32, 35, and 36.

Lubrication for the piston, and for the bushing 19 in its engagement with the crank 18 and with the webs 33 and 34, will be provided in any suitable manner, as, for instance, by forced feed through suitable passages in the crankshaft 16. Since such lubrication forms no part of the present invention and can be accomplished by well known means, no illustration of specific means is included herein. If the mechanism herein disclosed is used in the illustrated vertical position, of course, lubricant will tend to accumulate in the lower portion of the piston; but the splashing action of the counterweights 21 will tend to cause such accumulating liquid to be thrown out through the slots 29 and 30 and the slots 31 and 32; and thence through the slots 35 and 36, which are guarded by conduit means 37 and 38 through which such lubricant can be returned to the circulating system.

In Fig. 2, I have illustrated a modified form of bushing 19'. In place of the annular groove 20, I provide the bushing 19' with two diametrically opposed pairs of spaced lips 44a and 44b, each pair of lips defining a groove in which is received the extremity of one or the other of the webs 33 and 34. In this form of the invention, the bushing will slide upon the surfaces of the webs 33 and 34, instead of rolling thereon.

I claim as my invention:

1. A mechanical movement comprising a cylinder closed at its opposite ends, a crankshaft diametrically traversing said cylinder substantially midway between said closed ends, and a double-ended piston reciprocably mounted in said cylinder, said piston being formed to provide a closed head at each end and a cylindrical skirt connecting said heads, said skirt being formed with two diametrically-opposed, axially extended slots for the accommodation of said shaft, and with two further diametrically-opposed axially extended slots angularly spaced substantially 90 degrees from said first-mentioned slots, said cylinder likewise being formed with a pair of slots registering with said further piston slots, a bushing rotatably mounted on the crank of said shaft located between said first-mentioned slots, and means located wholly within said piston and engageable with said bushing to provide a driving connection between said piston and said shaft, and conduit means registering with said cylinder slots.

2. A mechanical movement comprising a cylinder closed at its opposite ends, a crankshaft diametrically traversing said cylinder substantially midway between said closed ends, and a double-ended piston reciprocably mounted in said cylinder, said piston being formed to provide a closed head at each end and a cylindrical skirt connecting said heads, said skirt being formed with two diametrically-opposed, axially extended slots for the accommodation of said shaft, and with two further diametrically-opposed axially extended slots angularly spaced substantially 90 degrees from said first-mentioned slots, said cylinder likewise being formed with a pair of slots registering with said further piston slots, the imperforate portions of said skirt being of sufficient longitudinal extent to seal said opposite ends of said cylinder from said cylinder slots at all times, a bushing rotatably mounted on the crank of said shaft located between said first-mentioned slots, and means located wholly within said piston and engageable with said bushing to provide a driving connection between said piston and said shaft, and conduit means registering with said cylinder slots.

3. A double-ended piston comprising two complementary elements, each consisting of a head and a plurality of depending fingers arranged about the axis of said head in a cylindrical series, the peripheral distance between each finger and one of its neighbors being at least equal to the peripheral extent of said finger, and each of said fingers being formed, adjacent its extremity remote from its head, for interlocking engagement with one of the fingers of the other head.

4. A double-ended piston comprising two complementary elements, each consisting of a head and a plurality of depending fingers arranged about the axis of said head in a cylindrical series, the peripheral distance between each finger and one of its neighbors being at least equal to the peripheral extent of said finger, and each of said fingers of one of said heads being formed, adjacent its extremity remote from said head, with means engageable, by relative rotational movement about the axis of said heads, with corresponding means formed on a finger of the other of said heads for interlocking said elements.

5. A double-ended piston comprising two complementary elements, each consisting of a head and a plurality of depending fingers arranged about the axis of said head in a cylindrical series, the peripheral distance between each finger and one of its neighbors being at least equal to the peripheral extent of said finger, and each of said fingers of one of said heads being exteriorly rabbetted and formed, adjacent its extremity remote from said head, with means engageable, by relative rotational movement about the axis of said heads, with corresponding means formed on an interiorly rabbetted finger of the other of said heads for interlocking said elements.

6. A mechanical movement comprising a cylinder closed at its opposite ends, a crankshaft diametrically traversing said cylinder substantially midway between said closed ends, and a double-ended piston reciprocably mounted in said cylinder, said piston being formed to provide a closed head at each end and a cylindrical skirt connecting said heads, said skirt being formed with two diametrically-opposed, axially extended slots for the accommodation of said shaft, and with two further diametrically-opposed axially extended slots angularly spaced substantially 90 degrees from said first-mentioned slots, said cylinder likewise being formed with a pair of slots registering with said further piston slots, a bushing rotatably mounted on the crank of said shaft located between said first-mentioned slots, and means located wholly within said piston and engageable with said bushing to provide a driving connection between said piston and said shaft, and conduit means registering with said cylinder slots, said piston skirts cooperating to guard said cylinder slots at all times against communication with the ends of said cylinder beyond said closed piston heads.

7. A mechanical movement comprising a cylinder closed at its opposite ends, a crankshaft diametrically traversing said cylinder substantially midway between said closed ends, and a double-ended piston reciprocably mounted in said cylinder, said piston being formed to provide a closed head at each end and a cylindrical skirt connecting said heads, said skirt being formed with two diametrically-opposed, axially extended slots for the accommodation of said shaft, and with two further diametrically-opposed axially extended slots angularly spaced substantially 90 degrees from said first-mentioned slots, said cylinder likewise being formed with a pair of slots registering with said further piston slots, the imperforate portions of said skirt being of sufficient longitudinal extent to seal said opposite ends of said cylinder from said cylinder slots at all times, a bushing rotatably mounted on the crank of said shaft located between said first-mentioned slots, counterweight means for said bushing mounted on said shaft and adapted to splash lubricant from the interior of said piston through said cylinder slots, and means located wholly within said piston and engageable with said bushing to provide a driving connection between said piston and said shaft, and conduit means registering with said cylinder slots.

RAYMOND E. HEALD.